United States Patent
Shimizu et al.

(10) Patent No.: US 9,606,261 B2
(45) Date of Patent: Mar. 28, 2017

(54) ROOM ENTRY/EXIT DETECTION APPARATUS, ROOM ENTRY/EXIT DETECTION METHOD, AND COMPUTER-READABLE RECORDING MEDIUM HAVING PROGRAM RECORDED THEREON

(71) Applicant: NEC Solution Innovators, Ltd., Tokyo (JP)

(72) Inventors: Hideyuki Shimizu, Tokyo (JP); Kazuo Ishida, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 70 days.

(21) Appl. No.: 14/772,985

(22) PCT Filed: Feb. 6, 2014

(86) PCT No.: PCT/JP2014/052738
§ 371 (c)(1),
(2) Date: Sep. 4, 2015

(87) PCT Pub. No.: WO2014/136522
PCT Pub. Date: Sep. 12, 2014

(65) Prior Publication Data
US 2016/0018560 A1    Jan. 21, 2016

(30) Foreign Application Priority Data
Mar. 5, 2013   (JP) ................................ 2013-043065

(51) Int. Cl.
*G01V 8/10*   (2006.01)
*G01J 5/34*   (2006.01)
(Continued)

(52) U.S. Cl.
CPC .............. *G01V 8/10* (2013.01); *G01J 5/0025* (2013.01); *G01J 5/34* (2013.01); *G01P 15/00* (2013.01);
(Continued)

(58) Field of Classification Search
None
See application file for complete search history.

(56) References Cited

U.S. PATENT DOCUMENTS

| 5,861,806 A | 1/1999 | Vories et al. |
| 9,064,394 B1 * | 6/2015 | Trundle ........... G08B 13/19684 |

FOREIGN PATENT DOCUMENTS

| CN | 201773434 | 3/2011 | |
| JP | 07093675 A * | 4/1995 | ............ G08B 25/04 |

(Continued)

OTHER PUBLICATIONS

International Search Report, PCT/JP2014/052738, May 13, 2014.
(Continued)

*Primary Examiner* — Jennifer Simmons
*Assistant Examiner* — Ruben Parco, Jr.
(74) *Attorney, Agent, or Firm* — Young & Thompson

(57) ABSTRACT

A person detector detects a person in an area facing one door surface. An open/close detector detects whether the door is in an open or closed state. When a detected state of the door switches from a closed state to an open state, an open-state person detection information recorder records whether the person detector is detecting a person or not. When the state of the door detected by the open and close detection sensor switches from the open state to the closed state, a closed-state person detection information recorder records whether the person detector is detecting a person or not. A room entry and exit detector detects that there occurs an entry into the room and there occurs an exit out of the room on the basis of a content recorded by the open-state person detection information recorder and the closed-state person detection information recorder.

14 Claims, 11 Drawing Sheets

(51) Int. Cl.
G07C 9/00 (2006.01)
G01J 5/00 (2006.01)
G01P 15/00 (2006.01)

(52) U.S. Cl.
CPC ..... *G07C 9/00174* (2013.01); *G07C 2209/62* (2013.01); *G07C 2209/63* (2013.01)

(56) References Cited

FOREIGN PATENT DOCUMENTS

| | | |
|---|---|---|
| JP | 8-273083 | 10/1996 |
| JP | 2002-074371 | 3/2002 |
| JP | 2002-216100 | 8/2002 |
| JP | 2004-259136 | 9/2004 |
| JP | 2006-112851 | 4/2006 |
| JP | 2009-99059 | 5/2009 |
| JP | 2009-175105 | 8/2009 |
| JP | 2011-186779 | 9/2011 |

OTHER PUBLICATIONS

Chinese Office Action dated Sep. 5, 2016 in corresponding Chinese Patent Application No. 201480011943.2 with English translation of Chinese Office Action.
Korean Official Action—10-2015-7027381—Jun. 1, 2016.

* cited by examiner

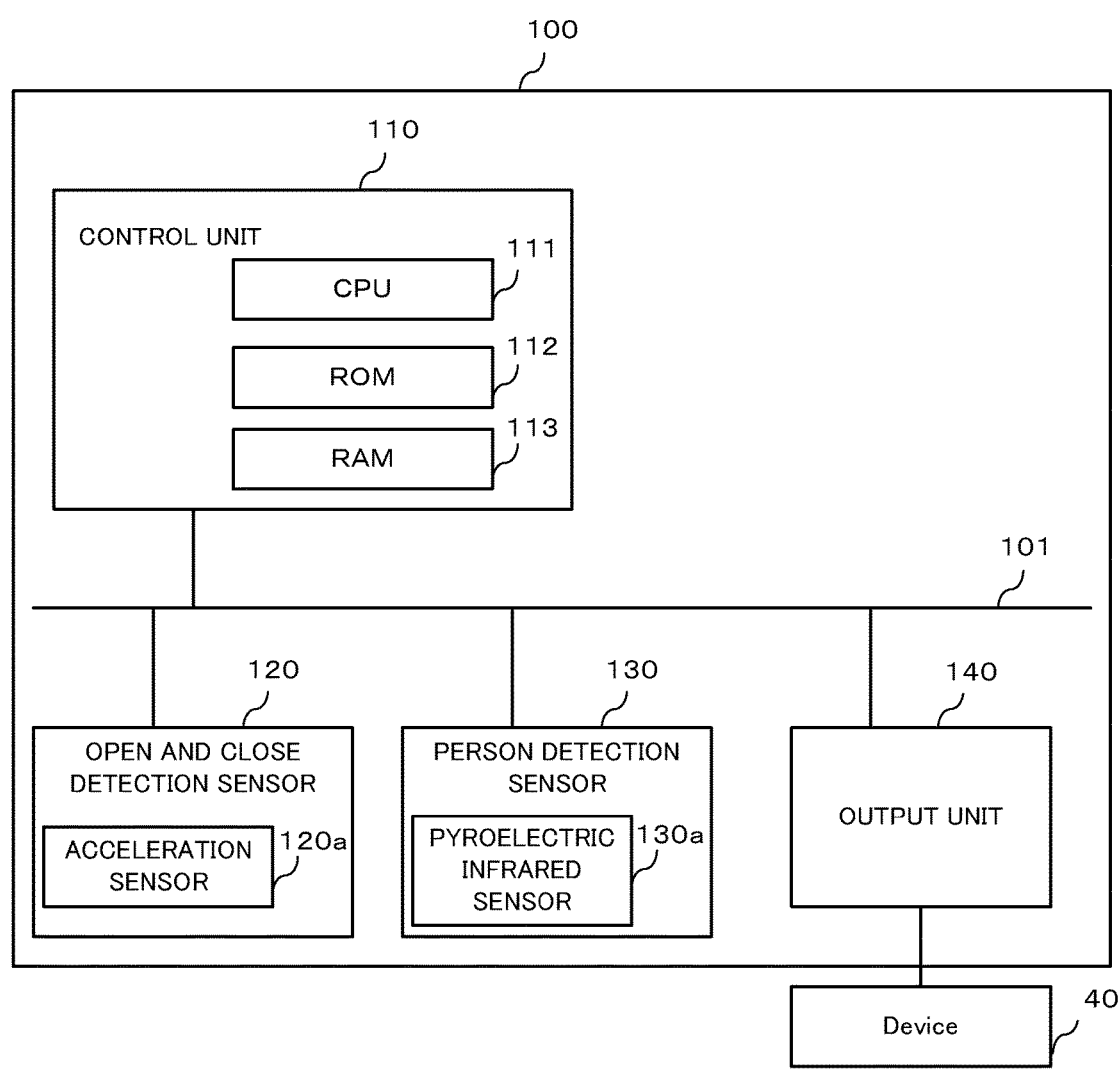

ENTRY INTO ROOM

EXIT OUT OF ROOM

COME CLOSE TO AREA AT FRONT SURFAC
(WITHOUT OPENING AND CLOSING DOOR)

COME CLOSE TO AREA AT BACK SURFACE
(WITHOUT OPENING AND CLOSING DOOR)

OPEN AND CLOSE FROM FRONT SURFACE
(WITHOUT ENTERING INTO ROOM OR EXITING OUT OF ROOM)

OPEN AND CLOSE FROM BACK SURFACE
(WITHOUT ENTERING INTO ROOM OR EXITING OUT OF ROOM)

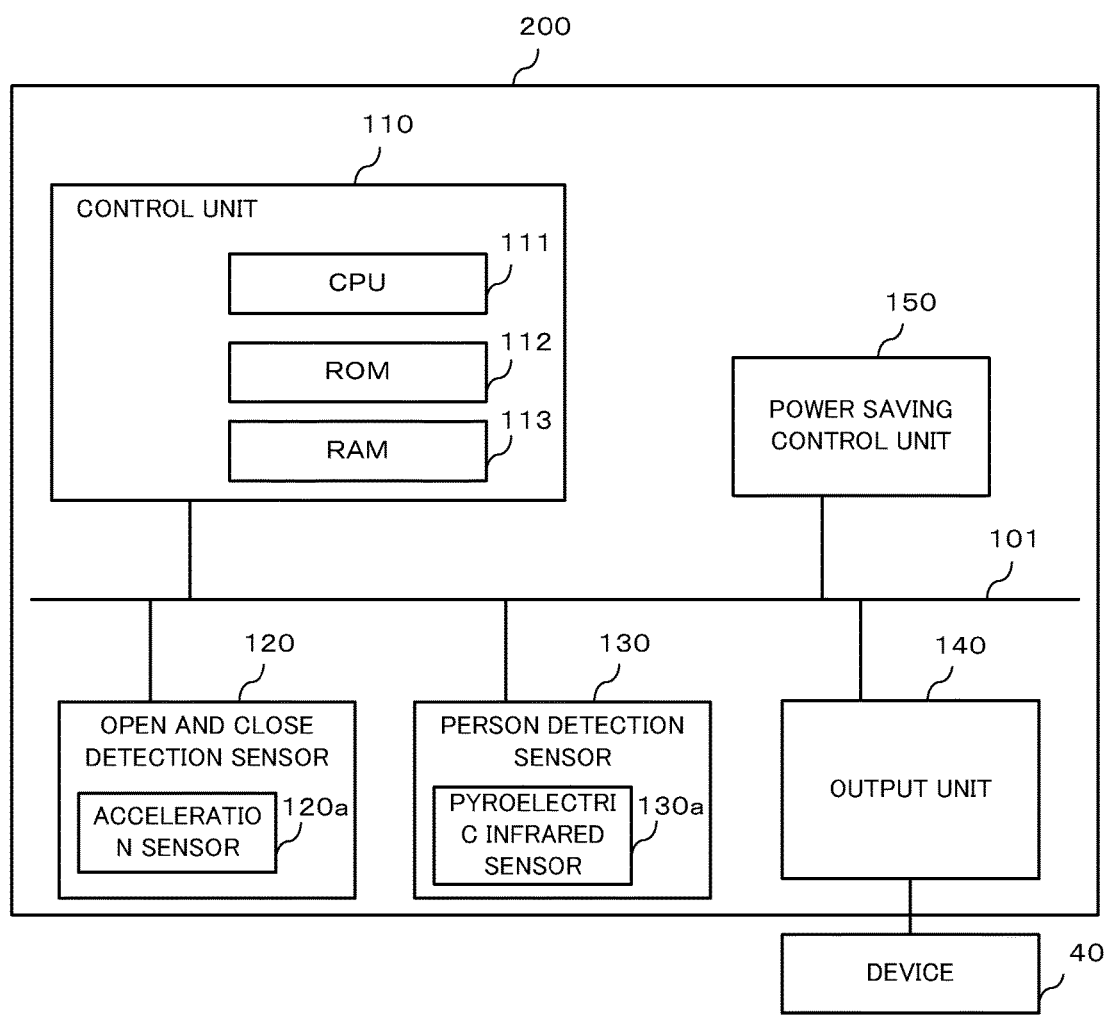

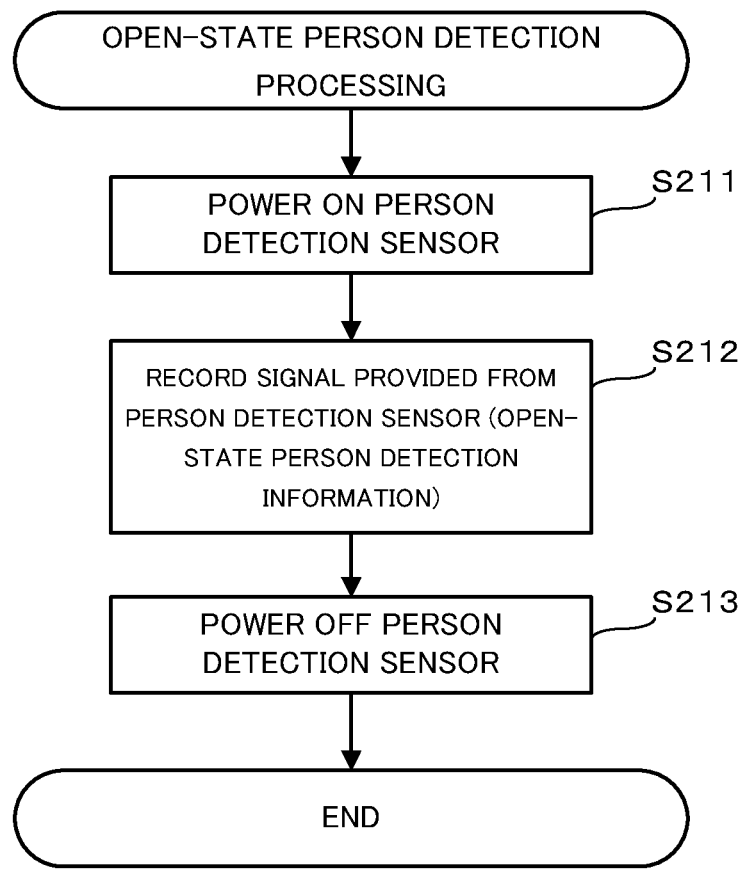

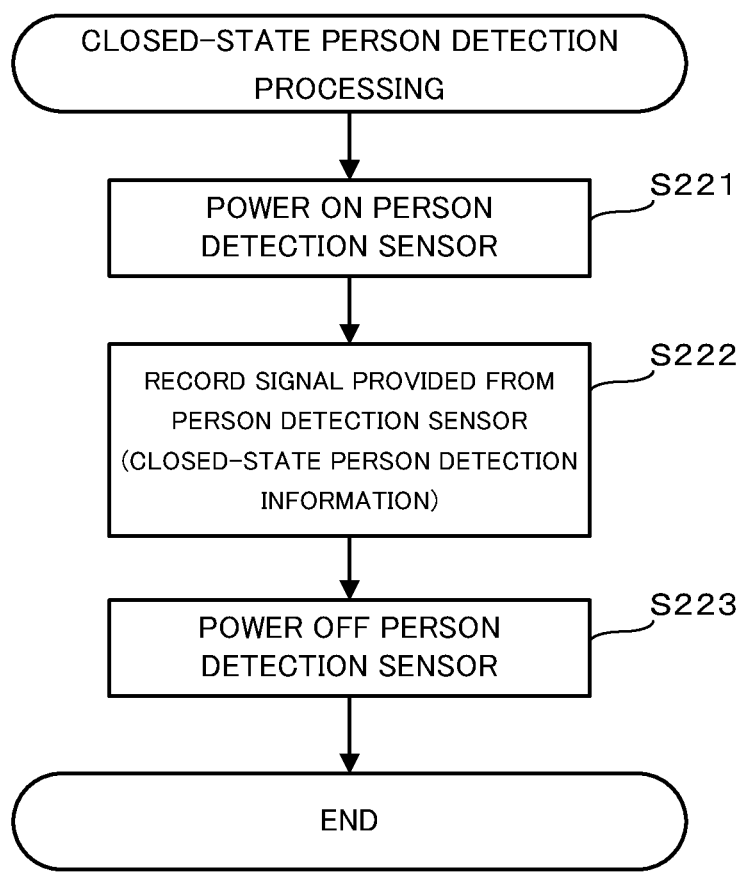

ROOM ENTRY/EXIT DETECTION APPARATUS, ROOM ENTRY/EXIT DETECTION METHOD, AND COMPUTER-READABLE RECORDING MEDIUM HAVING PROGRAM RECORDED THEREON

TECHNICAL FIELD

The present disclosure relates to a room entry and exit detection apparatus, a room entry and exit detection method, and a computer-readable recording medium having a program recorded thereon.

BACKGROUND ART

There exists a technique for accurately finding the number of people who enters into and exits from a building or a room.

For example, Patent Literature 1 discloses an invention in which a television camera is installed to capture an image around a door and detect entry into a room and detect exit out of a room from a change in the captured image. In this invention, a human body is detected from a captured image, and entry into and exit out of the room is detected from the direction of the passage, so that the number of people passing through the monitoring area is counted.

Patent Literature 2 discloses a system including two person-detection sensors provided along the travelling direction of an aisle around a doorway, and detecting a person who enters into the room or exits out of the room from a time difference of detection signals detected by the two person-detection sensors. This system determines that a person (human) moves in a direction from a person-detection sensor reacted first to a person-detection sensor reacted later.

Patent Literature 3 discloses an invention for detecting room entry and exit by using person detection sensors installed in a doorway at the inside and the outside of the room and an auxiliary sensor installed at the side of the door to detect a transition body. This invention detects a person who enters into the room or a person who exits out of the room in accordance with the order of reactions of the three sensors. In this invention, the auxiliary sensor is used to prevent false detection caused by a movement of a person who does not pass through the door, and this invention achieves a higher level of detection of room entry and exit than the invention disclosed by Patent Literature 2.

CITATION LIST

Patent Literature

Patent Literature 1: Unexamined Japanese Patent Application Kokai Publication No. 2002-074371
Patent Literature 2: Unexamined Japanese Patent Application Kokai Publication No. 2006-112851
Patent Literature 3: Unexamined Japanese Patent Application Kokai Publication No. 2002-216100

SUMMARY OF INVENTION

Technical Problem

Any of the techniques disclosed in Patent Literatures explained above has a problem in that room entry and exit cannot be detected accurately using a small number of sensors.

In the technique disclosed by Patent Literature 1, in some cases, the detection accuracy of room entry and exit may be reduced because of outside light that enters into a captured image. Therefore, in order to detect room entry and exit with a high degree of accuracy, it is necessary to, e.g., install multiple television cameras and employ a dedicated processor for image processing, which leads to the increase in the cost.

In the technique disclosed by Patent Literature 2, for example, when the two person-detection sensors reacts to different persons, entry into or exit out of the room may be falsely detected. This false detection can be avoided by, for example, installing more person-detection sensors in the travelling direction, or by employing an auxiliary sensor for detecting a transition body as shown in Patent Literature 3, but the number of required sensor elements increases by one. With the increase in the number of sensor elements, there is an increase in the trouble and the cost during the installation, and in addition, there is an increase in the power consumption, and therefore, the maintenance cost also increases accordingly.

The present disclosure is made in view of the above problems, and it is an objective of the present disclosure to provide a room entry and exit detection apparatus, a room entry and exit detection method, and a computer-readable recording medium having a program recorded thereon for accurately detecting entry and exit with a less number of sensors.

Solution to Problem

In order to achieve the above objective, a room entry and exit detection apparatus according to a first aspect of the present disclosure includes:

a person detection sensor configured to detect a person in an area facing one surface of a door;

an open and close detection sensor configured to detect whether the door is in an open state or in a closed state;

an open-state person detection information recorder, wherein when a state of the door detected by the open and close detection sensor switches from a closed state to an open state, the open-state person detection information recorder is configured to record whether the person detection sensor is detecting a person or not at that point in time;

a closed-state person detection information recorder, wherein when the state of the door detected by the open and close detection sensor switches from the open state to the closed state, the closed-state person detection information recorder is configured to record whether the person detection sensor is detecting a person or not at that point in time; and a room entry and exit detector configured to detect that there occurs an entry into the room and there occurs an exit out of the room on the basis of a content recorded by the open-state person detection information recorder and the closed-state person detection information recorder.

In order to achieve the above objective, a room entry and exit detection method according to a second aspect of the present disclosure includes:

a person detection step of detecting a person in an area facing one surface of a door;

an open and close detection step of detecting whether the door is in an open state or in a closed state;

an open-state person detection information recording step of, when a state of the door detected in the open and close detection step switches from a closed state to an open state, recording whether a person is detected or not at that point in time in the person detection step;

a closed-state person detection information recording step of, when the state of the door detected in the open and close detection step switches from the open state to the closed state, t recording whether a person is detected or not at that point in time in the person detection step; and a room entry and exit detection step of detecting that there occurs an entry into the room and there occurs an exit out of the room on the basis of a content recorded in the open-state person detection information recording step and the closed-state person detection information recording step.

In order to achieve the above objective, a computer-readable recording medium according to a third aspect of the present disclosure, recorded with a program for causing a computer to realize:

a person detection function configured to detect a person in an area facing one surface of a door;

an open and close detection function configured to detect whether the door is in an open state or in a closed state;

an open-state person detection information recording function, wherein when a state of the door detected by the open and close detection function switches from a closed state to an open state, the open-state person detection information recording function is configured to record whether the person detection function is detecting a person or not at that point in time;

a closed-state person detection information recording function, wherein when the state of the door detected by the open and close detection function switches from the open state to the closed state, the closed-state person detection information recording function is configured to record whether the person detection function is detecting a person or not at that point in time; and a room entry and exit detection function configured to detect that there occurs an entry into the room and there occurs an exit out of the room on the basis of a content recorded by the open-state person detection information recording function and the closed-state person detection information recording function.

Advantageous Effects of Invention

According to the present disclosure, a room entry and exit detection apparatus, a room entry and exit detection method, and a computer-readable recording medium having a program recorded thereon for accurately detecting entry and exit with a less number of sensors can be provided.

BRIEF DESCRIPTION OF DRAWINGS

FIG. 1 is a block diagram illustrating a room entry and exit detection apparatus according to a first embodiment;

FIG. 7 is a block diagram illustrating a room entry and exit detection apparatus according to a second embodiment;

FIG. 9A is a flowchart illustrating open-state person detection processing according to the second embodiment;

FIG. 9B is a flowchart illustrating closed-state person detection processing according to the second embodiment.

DESCRIPTION OF EMBODIMENTS

Figure 2A:
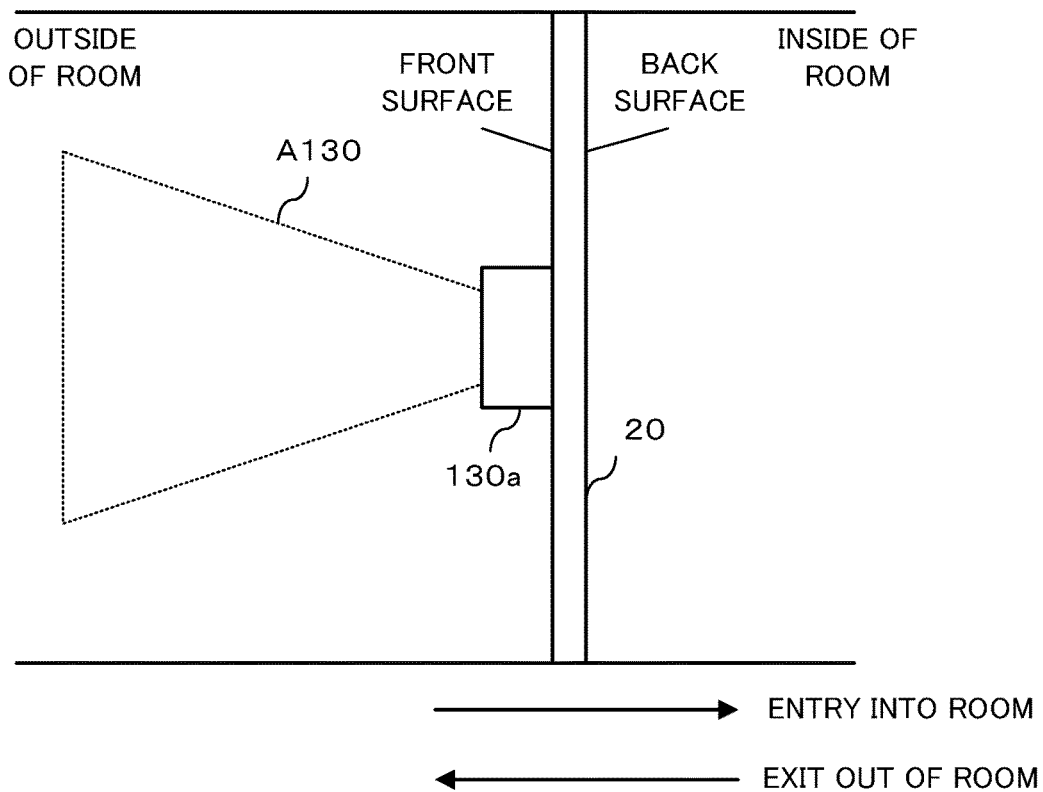
FIG. 2A is a figure illustrating an arrangement of a door and a pyroelectric infrared sensor according to a first embodiment.

Hereinafter, a room entry and exit detection apparatus according to embodiments of the present disclosure will be explained with reference to drawings.

First Embodiment

A room entry and exit detection apparatus 100 according to the first embodiment detects a person passing through a doorway of a monitoring target and entering into a room, or detects a person passing through the doorway of the monitoring target and exiting out of the room, and notifies a monitoring person or another device of the entry into or exit out of the room.

As shown in FIG. 1, the room entry and exit detection apparatus 100 includes a control unit 110 configured to control the entire apparatus, an open and close detection sensor 120 configured to detect whether a door of a monitoring target is in an open state (open state) or in a closed state (closed state), a person detection sensor 130 configured to detect whether there is a person in an area facing a surface of the door or not, and an output unit 140 configured to notify the device 40 of an entry into the room and an exit out of the room. Each of the constituent elements provided in the room entry and exit detection apparatus 100 is connected with each other via a bus 101.

The control unit 110 includes a CPU (Central Processing Unit) 111, a ROM (Read Only Memory) 112, and a RAM (Random Access Memory) 113. The CPU 111 controls operation of the entire room entry and exit detection apparatus 100 in accordance with a control program stored in the ROM 112 and the like. The ROM 112 stores the control program. The RAM 113 temporarily saves data used by the CPU 111 (for example, open-state person detection information and closed-state person detection information explained later). The control unit 110 transmits and receives a signal via the bus 101 to/from other constituent elements provided in the room entry and exit detection apparatus 100, thereby controlling these constituent elements.

The open and close detection sensor 120 detects whether the state of the door of the monitoring target is in the open state or in the closed state, and provides the control unit 110 with information indicating whether the state of the door of the monitoring target is in the open state or in the closed state.

The open and close detection sensor 120 includes an acceleration sensor 120a attached to the door of the monitoring target. When the door of the monitoring target is opened or closed, the acceleration sensor 120a detects acceleration caused by the open and close operation. The open and close detection sensor 120 determines whether the acceleration detected by the acceleration sensor 120a corresponds to acceleration of an open state pattern or acceleration of a closed state pattern, and determines whether the state of the door is in the open state or the closed state on the basis of the determination result.

The open and close detection sensor 120 provides the control unit 110 with an open signal indicating the open state while the state of the door is in the open state, and provides the control unit 110 with a closed signal indicating the closed state while the state of the door is the closed state.

The person detection sensor 130 detects whether there is a person in the area facing one surface of the door of the monitoring target or not, and provides the control unit 110 with information indicating whether there is a person in the area facing one surface of the door of the monitoring target or not. One of the surfaces of the door of the monitoring target will be referred to as a "front surface", the other of the surfaces thereof will be referred to as a "back surface", the space at the front surface side of the door will be referred to as an "outside of the room", the space at the back surface side thereof will be an "inside of the room", a person moving from the outside of the room into the inside of the room will be referred to as an "entry into the room", and a person who moves from the inside of the room to the outside of the room will be referred to as the "exit out of the room".

The person detection sensor 130 includes a pyroelectric infrared sensor 130a. The pyroelectric infrared sensor 130a receives infrared light form a detectable area (hereinafter referred to as an area A130) enclosed by a dotted line as shown in FIG. 2A. The pyroelectric infrared sensor 130a detects whether there is a person in the detectable area (the field of vision) or not from a change in the amount of received infrared light.

Figure 2B:
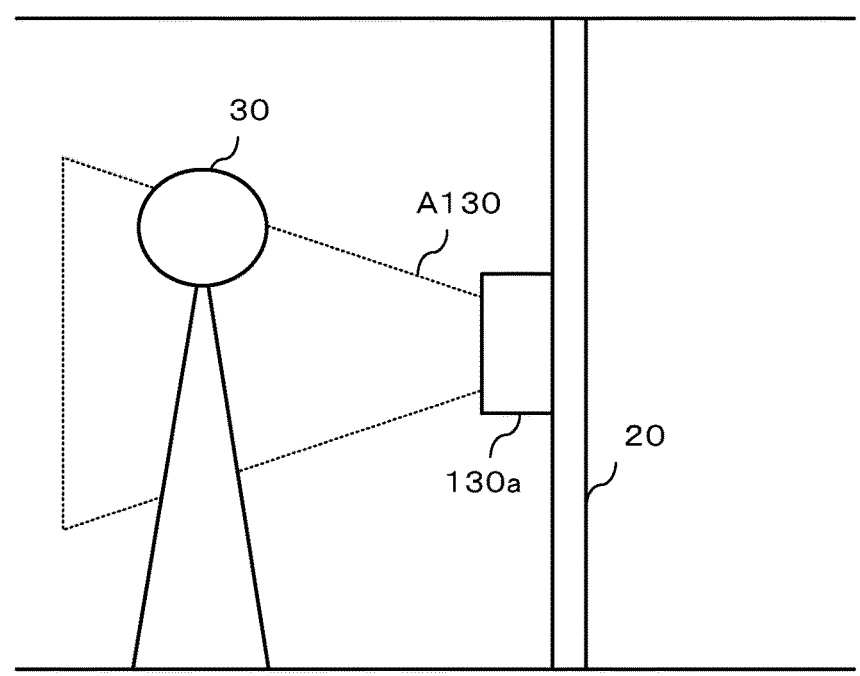
FIG. 2B is a figure illustrating a positional relationship of a pyroelectric infrared sensor and a person when the pyroelectric infrared sensor detects existence of a person.

While there is a person in the detectable area, the person detection sensor 130 provides the control unit 110 with a person detection signal indicating that there exists a person, and while there is not any person in the detectable area, the person detection sensor 130 provides the control unit 110 with a person non-detection signal indicating that there does not exist any person As shown in FIGS. 2A and 2B, the pyroelectric infrared sensor 130a is attached to the front surface side of the door 20 of the monitoring target, and detects whether a person 30 exists in the detection target area (area A130) or not.

As shown in FIG. 2A, in a case where there does not exist any person in the detection target area (area A130), the person detection sensor 130 provides the person non-detection signal to the control unit 110. As shown in FIG. 2B, in a case where there exists a person 30 in the detection target area (area A130), the person detection sensor 130 provides the person detection signal to the control unit 110.

Under the control of the control unit 110, the output unit 140 outputs, to the device 40, "information indicating presence of entry into the room" indicating that there occurs an entry into the room, or "information indicating presence of exit out of the room" indicating that there occurs an exit out of the room.

When the device 40 receives the information indicating presence of entry into the room or the information indicating presence of exit out of the room, the device 40 displays, on the screen, the received information indicating presence of entry into the room or the received information indicating presence of exit out of the room. When the device 40 receives the information indicating presence of entry into the room, a sound effect corresponding to the information indicating presence of entry into the room is output from the speaker, and when the device 40 receives the information indicating presence of exit out of the room, a sound effect corresponding to the information indicating presence of exit out of the room is output from the speaker. As described above, the device 40 notifies the monitoring person that there occurs an entry into the room or there occurs an exit out of the room. The device 40 counts the number of times that each of the information indicating presence of entry into the room and the information indicating presence of exit out of the room is provided, thereby calculating the number of people who enters into the room and the number of people who exits out of the room.

Hereinafter, room entry and exit detection processing executed by the room entry and exit detection apparatus 100 will be explained with reference to FIG. 3. The room entry and exit detection apparatus 100 starts the room entry and exit detection processing during activation, and continues the room entry and exit detection processing until an user performs a stop operation (shut down operation and the like).

After the room entry and exit detection processing is started, the control unit 110 waits until a signal provided from the open and close detection sensor 120 changes from the closed signal to the open signal (step S110).

When the control unit 110 detects that the signal provided from the open and close detection sensor 120 changes to the open signal (step S110: YES), the control unit 110 records the signal provided from the person detection sensor 130 at that point in time as open-state person detection information (step S120). In this case, when the signal provided from the person detection sensor 130 to the control unit 110 is a person detection signal, the control unit 110 records, to the RAM 113, the open-state person detection information indicating that the person is detected when the door 20 is opened. When the signal provided from the person detection sensor 130 to the control unit 110 is a person non-detection signal, the control unit 110 records, to the RAM 113, the open-state person detection information indicating that the person is not detected when the door 20 is opened. As described above, the control unit 110 functions as an open-state person detection information recorder for recording the content detected by the person detection sensor 130 when the door 20 of the monitoring target is opened.

Subsequently, the control unit 110 determines whether or not the signal provided from the open and close detection sensor 120 changes from the open signal to the closed signal (step S130).

When the control unit 110 determines that the signal provided from the open and close detection sensor 120 changes from the open signal to the closed signal (step S130: YES), the signal provided from the person detection sensor 130 at that point in time is recorded as closed-state person detection information (step S140). In this case, when the signal provided from the person detection sensor 130 to the control unit 110 is a person detection signal, the control unit 110 records, to the RAM 113, closed-state person detection information indicating that a person is detected when the door 20 is closed. When the signal provided from the person detection sensor 130 to the control unit 110 is a person non-detection signal, the control unit 110 records, to the RAM 113, closed-state person detection information indicating that any person is not detected when the door 20 is closed. As described above, the control unit 110 functions as a closed-state person detection information recorder for recording the content detected by the person detection sensor 130 when the door 20 of the monitoring target is closed.

Subsequently, the control unit 110 determines whether there occurs an entry into the room on the basis of the open-state person detection information and the closed-state person detection information recorded in the RAM 113 (step S150). More specifically, the control unit 110 determines whether the open-state person detection information indicates that a person is detected when the door 20 is opened, and the closed-state person detection information indicates that any person is not detected when the door 20 is closed (step S150). In the case where the open-state person detection information indicates that a person is detected when the door 20 is opened, and the closed-state person detection information indicates that any person is not detected when the door 20 is closed, the control unit 110 determines that there occurs an entry into the room (detects that there occurs an entry into the room) (step S150: YES).

In a case where it is determined that there occurs an entry into the room, the control unit 110 provides a signal indicating that there occurs an entry into the room to the output unit 140 via the bus 101 (step S151). An output unit 140 provides the provided signal indicating that there occurs an entry into the room to the device 40.

In a case where, in step S150, the open-state person detection information indicates that any person is not detected when the door 20 is opened, or the closed-state person detection information indicates that a person is detected when the door 20 is closed, the control unit 110 determines that there is not any entry into the room (step S150: NO). In a case where it is determined that there is not any entry into the room, the control unit 110 determines whether or not the open-state person detection information indicates that any person is not detected when the door 20 is opened, and the closed-state person detection information indicates that a person is detected when the door 20 is closed (step S160). Then, in a case where the open-state person detection information indicates that any person is not detected when the door 20 is opened, and the closed-state person detection information indicates that a person is detected when the door 20 is closed, the control unit 110 determines that there occurs an exit out of the room (detects that there occurs an exit out of the room) (step S160: YES).

In a case where it is determined that there occurs an exit out of the room in step S160, the control unit 110 provides a signal indicating that there occurs an exit out of the room to the output unit 140 via the bus 101 (step S161). The output unit 140 provides the provided signal indicating that indicating that there occurs an exit out of the room to the device 40.

As described above, in steps S150 and S160, the control unit 110 functions a room entry and exit detector for detecting that there occurs an entry into the room and an exit out of the room on the basis of the open-state person detection information and the closed-state person detection information.

In a case where, step S160, the open-state person detection information indicates that a person is detected when the door 20 is opened, or the closed-state person detection information indicates that any person is not detected when the door 20 is closed (step S160: NO), the control unit 110 executes the processing in step S110. When the processing in step S151 or the processing in step S161 is finished, the control unit 110 executes the processing in step S110.

The control unit 110 repeatedly executes the processing in steps S110 to 161 until the user performs a stop operation (shut down of the room entry and exit detection apparatus 100 and the like).

Hereinafter, a method for detecting that there occurs an entry into the room and there occurs an exit out of the room will be explained in details with reference to FIGS. 4A to F.

Figure 4A:
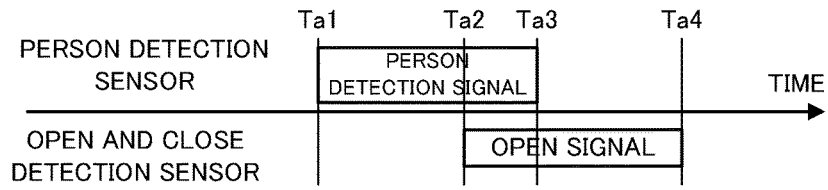
FIG. 4A is a figure illustrating a relationship of a time when a person enters into a room and a signal which is output from each sensor.
Figure 4B:
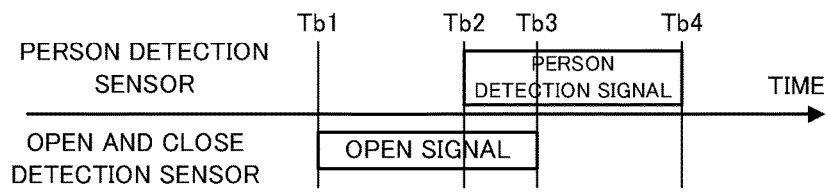
FIG. 4B is a figure illustrating a relationship of a time when a person exits out of a room and a signal which is output from each sensor.
Figure 4C:
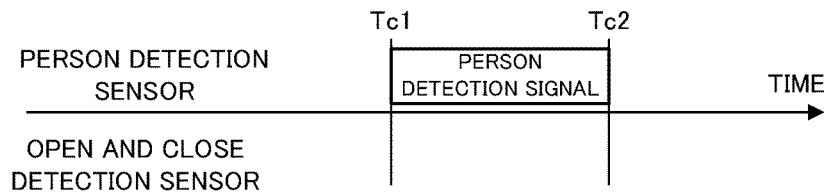
FIG. 4C is a figure illustrating a relationship of a time when a person approaches the front surface of the door but the door is not opened and closed and a signal which is output from each sensor.
Figure 4D:
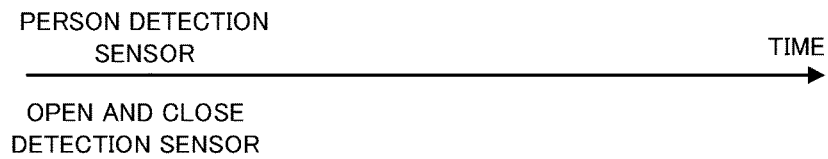
FIG. 4D is a figure illustrating a relationship of a time when a person approaches the back surface of the door but the door is not opened and closed and a signal which is output from each sensor.
Figure 4E:
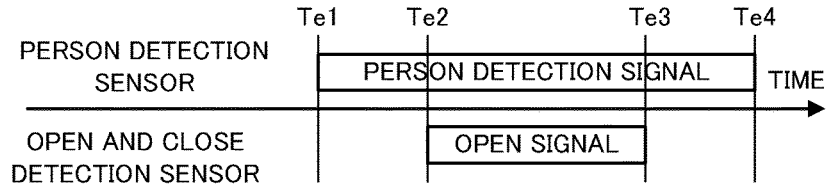
FIG. 4E is a figure illustrating a relationship of a time when the door is opened and closed from the front surface side but no one enters into or exits out of the room and a signal which is output from each sensor.
Figure 4F:
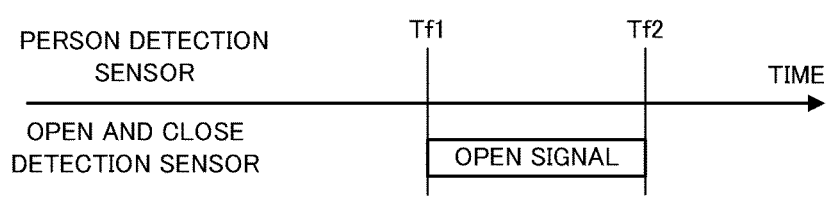
FIG. 4F is a figure illustrating a relationship of a time when the door is opened and closed from the back surface side but no one enters into or exits out of the room and a signal which is output from each sensor.

FIG. 4A indicates a time in which the output signal of the person detection sensor 130 becomes a "person detection signal" and a time in which the output signal of the open and close detection sensor 120 becomes an "open signal" when the person enters into the room. FIG. 4B indicates a time in which the output signal of the person detection sensor 130 becomes a "person detection signal" and a time in which the output signal of the open and close detection sensor 120 becomes an "open signal" when the person exits out of the room. FIG. 4C indicates a time in which the output signal of the person detection sensor 130 becomes a "person detection signal" and a time in which the output signal of the open and close detection sensor 120 becomes an "open signal" when the person comes to the front surface of the door 20 but the person does not open and close the door 20. FIG. 4D indicates a time in which the output signal of the person detection sensor 130 becomes a "person detection signal" and a time in which the output signal of the open and close detection sensor 120 becomes an "open signal" when the person comes to the back surface of the door 20 but the person does not open and close the door 20. FIG. 4E indicates a time in which the output signal of the person detection sensor 130 becomes a "person detection signal" and a time in which the output signal of the open and close detection sensor 120 becomes an "open signal" when the person only opens and closes the door 20 from the front surface but the person does not enter into the room. FIG. 4F indicates a time in which the output signal of the person detection sensor 130 becomes a "person detection signal" and a time in which the output signal of the open and close detection sensor 120 becomes an "open signal" when the person only opens and closes the door 20 from the back surface but the person does not exit out of the room.

First, a case where a person enters into the room will be explained.

In a case where a person passes through the doorway of the monitoring target to enter into the room, the person behaves in the following order: (1) the person stands in front of the front surface of the door 20 (this point in time is denoted as Ta1), (2) the person opens the door 20 (this point in time is denoted as Ta2), (3) the person passes through the doorway (this point in time is denoted as Ta3), and thereafter, (4) the person closes the door 20 (this point in time is denoted as Ta4).

When the person performs the series of behaviors (1) to (4) as described above, the time in which the output of the person detection sensor 130 becomes the "person detection signal" and the time in which the output of the open and close detection sensor 120 becomes the "open signal" are as shown in FIG. 4A. More specifically, (1) when the person is located at the front surface of the door 20 before the person enters into the room, the person detection sensor 130 detects the person, and the output of the person detection sensor 130 attains the person detection signal (point in time Ta1). Then, (2) when the person opens the door 20 in order to enter into the room, the output of the open and close detection sensor 120 attains the open signal (point in time Ta2). At this point in time, the output of the person detection sensor 130 is the "person detection signal", and the control unit 110 records the open-state person detection information indicating that the person is detected when the door 20 is opened. Subsequently, (3) when the person passes through the doorway, there is no longer any person at the front surface of the door 20, so that the output of the person detection sensor 130 attains the person non-detection signal (point in time Ta3). Finally, (4) when the person closes the door 20, the output of the open and close detection sensor 120 attains the closed signal (point in time Ta4). At this point in time, the output of the person detection sensor 130 is the "person non-detection signal", and the control unit 110 records the closed-state person detection information indicating that any person is not detected when the door 20 is closed.

When the control unit 110 records the closed-state person detection information (step S140), the control unit 110 determines whether there occurs an entry into the room or an exit out of the room (step S150, step S160) or not. In this case, when the recorded open-state person detection information indicates that the person is detected when the door 20 is opened, and the closed-state person detection information indicates that any person is not detected when the door 20 is closed, and therefore, the control unit 110 determines that there occurs an entry into the room (detects that there occurs an entry into the room). The control unit 110 provides the output unit 140 with a signal indicating that there occurs an entry into the room, and the output unit 140 provides the device 40 with the provided signal indicating that there occurs an entry into the room.

As described above, in the case where the person passes through the doorway of the monitoring target and enters into the room, the control unit 110 correctly detects that there occurs an entry into the room.

Subsequently, a case where a person exits out of the room will be explained.

In the case where the person passes through the doorway of the monitoring target and exits out of the room, the person stands at the back surface of the door 20, and then, the person behaves in the following order: (1) the person opens the door 20 (this point in time will be denoted as Tb1), (2) the person passes through the doorway (this point in time will be denoted as Tb2), (3) the person closes the door 20 (this point in time will be denoted as Tb3), and (4) finally, the person leaves the front surface of the door 20 (this point in time will be denoted as Tb4).

When the person performs the series of behaviors (1) to (4) as described above, the time in which the output of the person detection sensor 130 becomes the "person detection signal" and the time in which the output of the open and close detection sensor 120 becomes the "open signal" are as shown in FIG. 4B. More specifically, at first, there is not any person in the area at the front surface side of the door 20, and therefore, the output of the person detection sensor 130 is a person non-detection signal. (1) When the person opens the door 20 in order to exit out of the room, the output of the open and close detection sensor 120 changes from a closed signal to an open signal (point in time Tb1). The signal which is output from the person detection sensor 130 at this point in time is a person non-detection signal, and the control unit 110 records the open-state person detection information indicating that any person is not detected when the door 20 is opened. Subsequently, (2) when the person passes through the doorway and enters into a predetermined area around the front surface of the door 20, the signal which is output from the person detection sensor 130 changes into a person detection signal (point in time Tb2). Subsequently, (3) when the person closes the door 20, the signal which is output from the open and close detection sensor 120 changes from an open signal into a closed signal (point in time Tb3). At this point in time, the signal which is output from the person detection sensor 130 is a person detection signal, and the control unit 110 records the closed-state person detection information indicating that a person is detected when the door 20 is closed. Finally, (4) when the person leaves the front surface of the door 20, the signal which is output from the person detection sensor 130 changes into a person non-detection signal.

When the control unit 110 records the closed-state person detection information (step S140), the control unit 110 determines whether there occurs an entry into the room or an exit out of the room (step S150, step S160). In this case, because the recorded open-state person detection information indicates that any person is not detected when the door 20 is opened and the recorded closed-state person detection information indicates that a person is detected when the door 20 is closed, the control unit 110 determines that there occurs an exit out of the room (detects that there occurs an exit out of the room). The control unit 110 provides the signal indicating that there occurs an exit out of the room to the output unit 140, and the output unit 140 provides the provided signal indicating that there occurs an exit out of the room to the device 40.

As described above, in a case where a person passes through the doorway of the monitoring target and exits out of the room, the control unit 110 correctly detects that there occurs an exit out of the room.

Subsequently, a case where a person comes to an area around the front surface of the door 20 but the person leaves the door 20 without opening and closing the door 20 will be explained.

In the case where the person stands at the front surface of the door 20 but the person leaves the front surface of the door 20 without opening and closing the door 20, the time in which the output of the person detection sensor 130 becomes the "person detection signal" and the time in which the output of the open and close detection sensor 120 becomes the "open signal" are as shown in FIG. 4C. More specifically, when the person stands at the front surface of the door 20, the signal which is output from the person detection sensor 130 attains a person detection signal (this point in time will be denoted as Tc1), and when the person leaves the front surface of the door 20, the signal which is output from the person detection sensor 130 attains a person non-detection signal (this point in time will be denoted as Tc2). Even if the person performs this series of operation, the signal which is output from the open and close detection sensor 120 does not change from the closed signal. In this case, the control unit 110 does not record the open-state person detection information or the closed-state person detection information, and detects neither an entry into the room nor an exit out of the room.

As described above, in the case where the person comes to the front surface of the door 20 but the person leaves the front surface of the door 20 without opening and closing the door 20, the control unit 110 detects neither an entry into the room nor an exit out of the room. More specifically, even if a person behaves as described above, the control unit 110 does not falsely detect a room entry and exit.

Subsequently, a case where a person comes to an area around the back surface of the door 20 but the person leaves the back surface of the door 20 without opening and closing the door 20 will be explained.

In the case where a person stands at the back surface of the door 20 but the person leaves the back surface of the door 20 without opening and closing the door 20, neither the signal which is output from the person detection sensor 130 nor the signal which is output from the open and close detection sensor 120 changes in the course of the series of operation as shown in FIG. 4D. In this case, the control unit 110 does not record the open-state person detection information or the closed-state person detection information, and detects neither an entry into the room nor an exit out of the room. More specifically, even if a person behaves as described above, the control unit 110 does not falsely detect a room entry and exit.

Subsequently, a case where a person comes to an area around the front surface of the door 20 and the person opens and closes the door 20 but the person does not enter into the room will be explained.

In this case, the person behaves in the following order: the person (1) stands at the front surface of the door 20 (this point in time will be denoted as Te1), (2) the person opens the door 20 (this point in time will be denoted as Te2), thereafter, (3) the person closes the door 20 (this point in time will be denoted as Te3), and finally, (4) the person leaves an area around the front surface of the door 20 (this point in time will be denoted as Te4).

When the person performs the series of behaviors (1) to (4) as described above, the time in which the output of the person detection sensor 130 becomes the "person detection signal" and the time in which the output of the open and close detection sensor 120 becomes the "open signal" are as shown in FIG. 4E. More specifically, (1) when the person is located at the front surface of the door 20, the person detection sensor 130 detects the person, and the signal which is output from the person detection sensor 130 becomes the person detection signal (point in time Te1). Then, (2) when the person opens the door 20, the signal which is output from the open and close detection sensor 120 changes to the open signal (point in time Te2). At this point in time, the signal which is provided by the person detection sensor 130 is the "person detection signal", and the control unit 110 records the open-state person detection information indicating that the person is detected when the door 20 is opened. Subsequently, (3) when the person closes the door 20, the signal which is output from the open and close detection sensor 120 changes to the closed signal (point in time Te3). At this point in time, the person resides at the front surface of the door 20, and therefore the signal which is output from the person detection sensor 130 is the person detection signal, and accordingly, the control unit 110 records the closed-state person detection information indicating that a person is detected when the door 20 is closed. Finally, (4) when the person leaves the front surface of the door 20, the signal which is output from the person detection sensor 130 changes to the person non-detection signal (point in time Te4).

When the control unit 110 records the closed-state person detection information (step S140), the control unit 110 determines whether there occurs an entry into the room or an exit out of the room (step S150, step S160). In this case, the recorded open-state person detection information indicates that the person is detected when the door 20 is opened, and the closed-state person detection information indicates that the person is detected when the door 20 is closed, and therefore, the control unit 110 determines that there is neither entry into the room nor an exit. In this case, the output unit 140 outputs neither "information indicating presence of entry into the room" indicating that a person enters into the room nor "information indicating presence of exit out of the room" indicating that a person exits.

As described above, in the case where a person comes to an area around the front surface of the door 20 and the person opens and closes the door 20 but the person does not enter into the room, the control unit 110 detects neither an entry into the room nor an exit out of the room. More specifically, even if a person behaves as described above, the control unit 110 does not falsely detect a room entry and exit.

Subsequently, a case where a person comes to an area around the back surface of the door 20 and opens and closes the door 20 but the person does not exit out of the room will be explained.

In this case, the person stands at the back surface of the door 20, and the person behaves in the following order: (1) the person opens the door 20 (this point in time will be denoted as Tf1), and (2) thereafter, the person closes the door 20 (this point in time will be denoted as Tf2) and returns.

When the person performs the series of behaviors (1) and (2) as described above, the time in which the output of the person detection sensor 130 becomes the "person detection signal" and the time in which the output of the open and close detection sensor 120 becomes the "open signal" are as shown in FIG. 4F. More specifically, (1) when the person opens the door 20, the signal which is output from the open and close detection sensor 120 changes to the open signal (point in time Tf1). At this point in time, there is not any person at the front surface of the door 20, and therefore, the signal which is output from the person detection sensor 130 is the person non-detection signal, and the control unit 110 records the open-state person detection information indicating that any person is not detected when the door 20 is opened. Subsequently, (2) when the person closes the door 20, the signal which is output from the open and close detection sensor 120 changes to the closed signal (point in time Tf2). At this point in time, there is not any person at the front surface of the door 20, the signal which is output from the person detection sensor 130 is the person non-detection signal, and therefore, the control unit 110 records the closed-state person detection information indicating that any person is not detected when the door 20 is closed.

After the control unit 110 records the closed-state person detection information (more specifically, after the point in time Tf2), the open-state person detection information indicates that any person is not detected when the door 20 is opened, and the closed-state person detection information indicates that any person is not detected when the door 20 is closed, and therefore, the control unit 110 determines that there does not occur any entry into the room or exit. In this case, the output unit 140 outputs neither the "information indicating presence of entry into the room" indicating that the person enters into the room nor the "information indicating presence of exit out of the room" indicating that the person exits.

As described above, in the case where the person comes to an area around the back surface of the door 20 and opens and closes the door 20 but the person does not enter into the room, the control unit 110 detects neither an entry into the room nor an exit out of the room. More specifically, even if a person behaves as described above, the control unit 110 does not falsely detect a room entry and exit.

As described above, even in a case where the open and close detection sensor 120 and the person detection sensor 130 individually react while there does not occur any entry into the room or exit out of the room, the room entry and exit detection apparatus 100 according to the present embodiment does not falsely output the "information indicating presence of entry into the room" and the "information indicating presence of exit out of the room".

As described above, the room entry and exit detection apparatus 100 according to the present embodiment can prevent false detection of a room entry and exit by using a combination of two sensor elements, which are, the open and close detection sensor 120 and the person detection sensor 130. Therefore, the room entry and exit detection apparatus 100 can detect a room entry and exit with a high degree of accuracy even when the number of sensor elements is small.

The first embodiment of the present disclosure has been hereinabove explained, but the present embodiment is not limited thereto.

Figure 5:
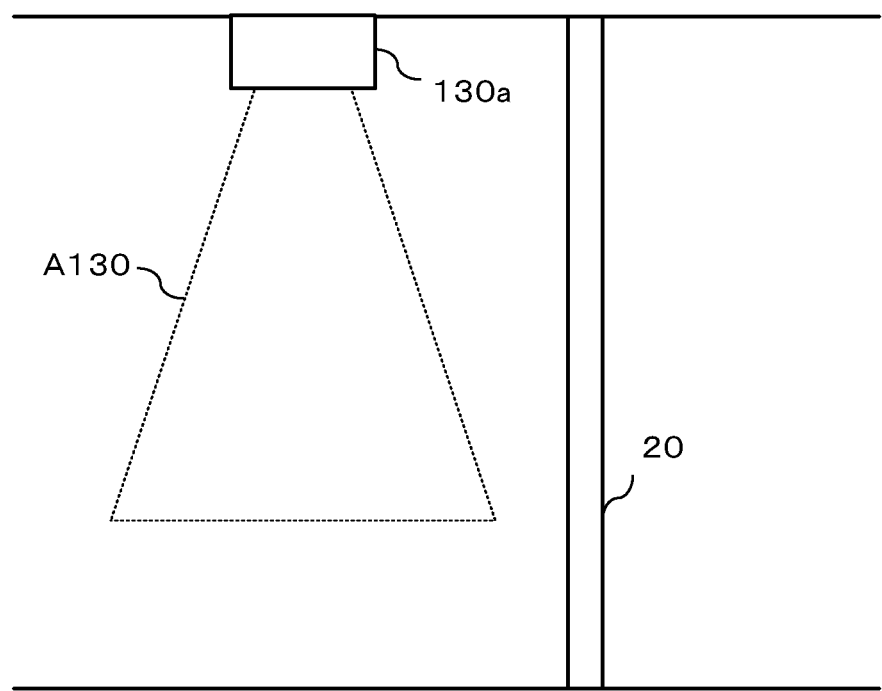
FIG. 5 is a figure illustrating an arrangement of a door and a pyroelectric infrared sensor in a case where a pyroelectric infrared sensor is installed on a ceiling according to the first embodiment.

The attachment position of the pyroelectric infrared sensor 130*a* is not limited to a surface of the door 20 as long as the pyroelectric infrared sensor 130*a* can detect a person in a detection target area at a side of a surface of the door 20. For example, as shown in FIG. 5, pyroelectric infrared sensor 130*a* may be disposed on a ceiling above the detection target area at a side of a surface of the door 20. The attachment method of the pyroelectric infrared sensor 130*a* may be any method.

Alternatively, although the person detection sensor 130 has the pyroelectric infrared sensor 130*a* in the present embodiment, for example, a piezoelectric sensor 130*b* may be provided instead of this.

Figure 6A:
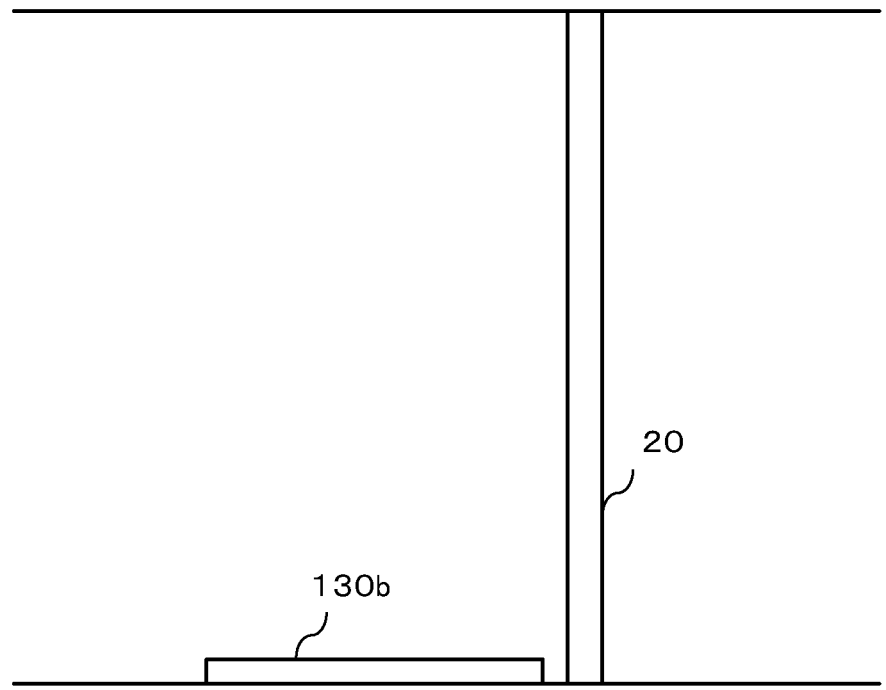
FIG. 6A is a figure illustrating an arrangement of a door and a piezoelectric sensor according to the first embodiment.
Figure 6B:
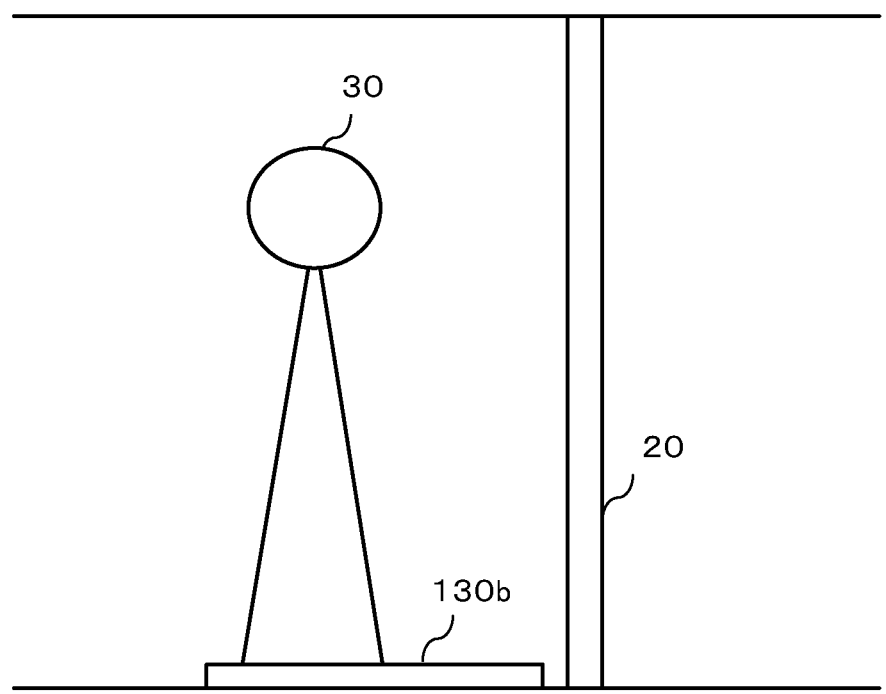
FIG. 6B is a figure illustrating how a person is stepping on a piezoelectric sensor arranged on a floor of a front surface side of a door.

The piezoelectric sensor 130*b* detects presence of a person on a detection surface when the internal voltage changes in a case where a pressure is applied to the detection surface. As shown in FIG. 6A, the piezoelectric sensor 130*b* is installed on a floor surface around the front surface of the door 20. As shown in FIG. 6B, in a case where there is a person 30 on the piezoelectric sensor 130*b*, a pressure is applied to the detection surface of the piezoelectric sensor 130*b* by the weight of the person 30, and the piezoelectric sensor 130*b* detects a change of the internal voltage of the piezoelectric sensor 130*b*, thus detecting presence of the person 30 on the detection surface.

In addition, there are many person detection sensors that can be applied to the present disclosure. For example, the present disclosure can be realized even when the person detection sensor is any one of an infrared sensor, an ultrasonic sensor, a visible light sensor.

In the present embodiment, the open and close detection sensor 120 includes the acceleration sensor 120*a*, but instead of this, for example, the open and close detection sensor 120 may be provided with a hole sensor and a switch using contact.

The output unit 140 may provide information indicating presence of entry into the room or information indicating presence of exit out of the room to another device via a wired communication, or may provide them to another device via a wireless communication. Further, the output unit 140 can communicate with another device using any given communication protocol.

Further, instead of providing information to another device, for example, the output unit 140 may display "there occurs an entry into the room" or "there occurs an exit out of the room" in a predetermined field of a display directly connected to the output unit 140. The output unit 140 may output, as audio, that there occurs a room entry and exit from the speaker directly connected to the output unit 140.

In the present embodiment, a signal provided from the person detection sensor 130 to the control unit 110 may be either a digital signal or an analog signal. Likewise, a signal provided from the open and close detection sensor 120 to the control unit 110 (open signal and closed signal), a signal provided by the output unit 140 (information indicating presence of entry into the room and information indicating presence of exit out of the room), and the like may also be either a digital signal or an analog signal.

In the present embodiment, the door of the doorway may be, for example, any one of a hinged door, a sliding door, a folding door, and an automatic door.

Second Embodiment

In the present embodiment, a room entry and exit detection apparatus providing the same functions as the room entry and exit detection apparatus shown in the first embodiment and further reducing the power consumption will be explained.

As shown in FIG. 7, the room entry and exit detection apparatus 200 according to the present embodiment includes a control unit 110 configured to control the entire apparatus, an open and close detection sensor 120 configured to detect whether the state of the door is an open state or a closed state, a person detection sensor 130 configured to detect whether there is a person in a predetermined area facing a front surface of the door, an output unit 140 configured to notify the device 40 of an entry into the room and an exit out of the room, and a power saving control unit 150. Each of the constituent elements provided in the room entry and exit detection apparatus 200 is connected with each other via a bus 101. Among them, the constituent elements other than the power saving control unit 150 are the same as those of the first embodiment, and explanation thereof is omitted.

Under the control of the control unit 110, the power saving control unit 150 supplies electric power to the person detection sensor 130, or stops the electric power supply, thus switching the operation state and the non-operation state of the person detection sensor 130. More specifically, when the power saving control unit 150 receives, from the control unit 110 via the bus 101, supply of a predetermined signal for causing the person detection sensor 130 to be in the operation state, the power saving control unit 150 starts electric power supply to the person detection sensor 130. Therefore, the state of the person detection sensor 130 becomes the operation state. When the power saving control unit 150 receives, from the control unit 110 via the bus 101, supply of a predetermined signal for causing the person detection sensor 130 to be in non-operation state, the power saving control unit 150 stops electric power supply to the person detection sensor 130. Therefore, the state of the person detection sensor 130 becomes the non-operation state.

Figure 8:
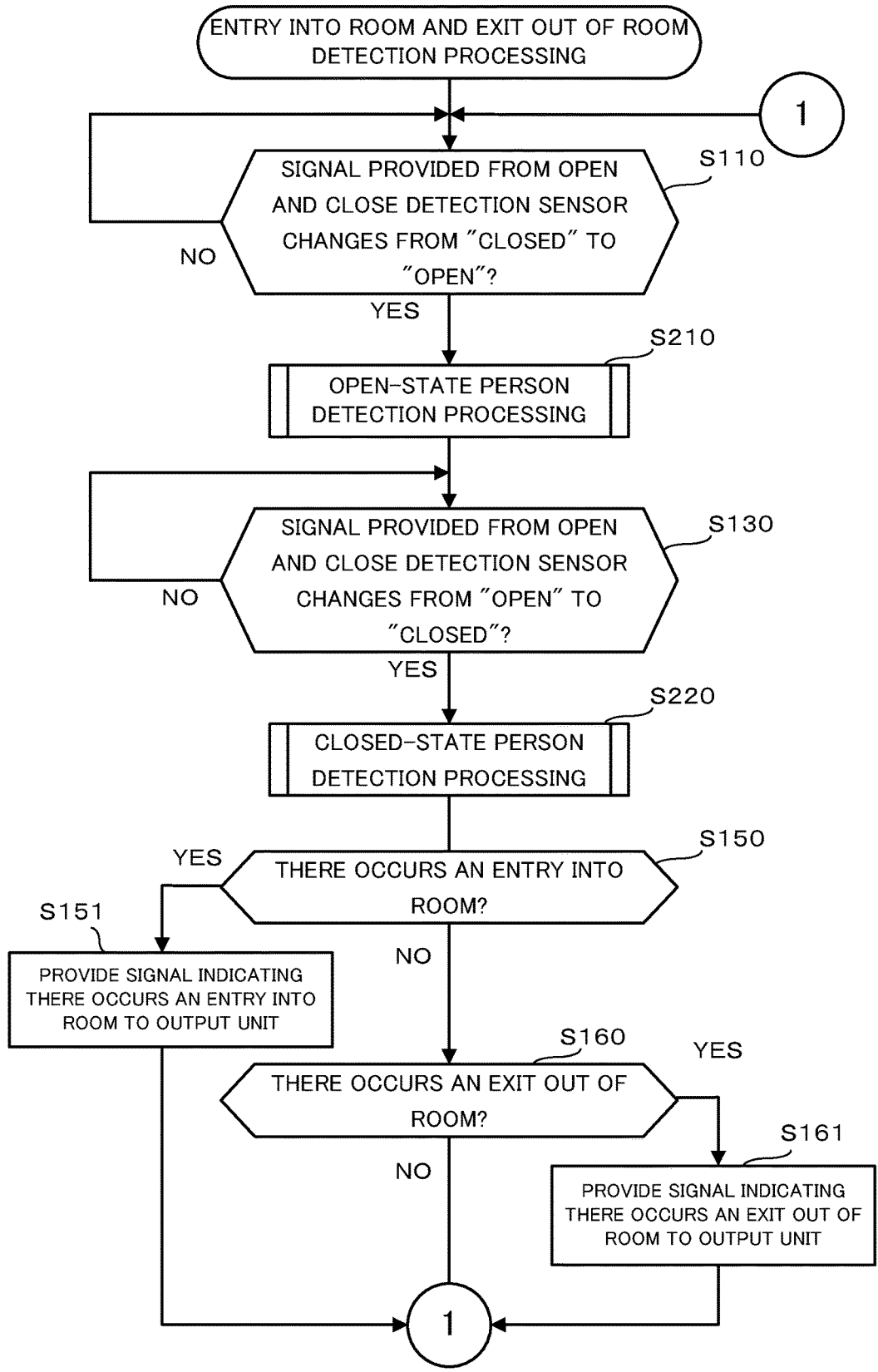
FIG. 8 is a flowchart illustrating room entry and exit detection processing according to the second embodiment.

Hereinafter, room entry and exit detection processing performed by the room entry and exit detection apparatus 200 will be explained with reference to FIG. 8. When the room entry and exit detection processing as shown in FIG. 8 is compared with the room entry and exit detection processing as shown in FIG. 3, the room entry and exit detection processing as shown in FIG. 8 is different from the room entry and exit detection processing as shown in FIG. 3 in the two features, and more specifically, the room entry and exit detection processing as shown in FIG. 8 is different in that the room entry and exit detection processing as shown in FIG. 8 includes step S210 "open-state person detection processing" instead of step S120 and includes step S220 "closed-state person detection processing" instead of step S140. Explanation about the same portions as those of the room entry and exit detection processing according to the first embodiment is omitted.

When the control unit 110 determines that the signal provided from the open and close detection sensor 120 changes from the closed signal to the open signal in step S110 (step S110: YES), the control unit 110 starts the open-state person detection processing (step S210).

Hereinafter, the open-state person detection processing will be explained with reference to FIG. 9A.

At the first of the open-state person detection processing, the control unit 110 causes the person detection sensor 130 to be in the operation state (step S211). More specifically, the control unit 110 provides, to the power saving control unit 150 via the bus 101, a predetermined signal for causing the person detection sensor 130 to be in the operation state. When the power saving control unit 150 receives supply of the predetermined signal from the control unit 110, the power saving control unit 150 starts electric power supply to the person detection sensor 130, and switches the state of the person detection sensor 130 to the operation state.

Subsequently, the control unit 110 records, as open-state person detection information, a signal provided from the person detection sensor 130 (step S212). More specifically, in a case where the state of the person detection sensor 130 becomes the operation state, and a person detection signal is provided to the control unit 110, the control unit 110 records, to the predetermined area of the RAM 113, the open-state person detection information indicating that a person is detected when the door 20 is opened. On the contrary, in a case where the state of the person detection sensor 130 becomes the operation state, and a person non-detection signal is provided to the control unit 110, the control unit 110 records, to the predetermined area of the RAM 113, the open-state person detection information indicating that the any person is not detected when the door 20 is opened.

Subsequently, the control unit 110 causes the person detection sensor 130 to be in the non-operation state (step S213). More specifically, the control unit 110 provides, to the power saving control unit 150 via the bus 101, a predetermined signal for causing the person detection sensor 130 to be in the non-operation state. The power saving control unit 150 receives supply of the predetermined signal from the control unit 110, and stops electric power supply to the person detection sensor 130, and switches the state of the person detection sensor 130 to the non-operation state.

When the processing in step S213 is finished, the control unit 110 terminates the open-state person detection processing, and executes the processing in step S130 as shown in FIG. 8.

When the control unit 110 determines that the signal provided from the open and close detection sensor 120 changes from the open signal to the closed signal in step S130 (step S130: YES), the control unit 110 starts the closed-state person detection processing (step S220).

Hereinafter, the closed-state person detection processing will be explained with reference to FIG. 9B.

At the start of the closed-state person detection processing, the control unit 110 causes the person detection sensor 130 to be in the operation state (step S221). More specifically, the control unit 110 provides, to the power saving control unit 150 via the bus 101, a predetermined signal for causing the person detection sensor 130 to be in the operation state. When the power saving control unit 150 receives supply of the predetermined signal from the control unit 110, the power saving control unit 150 starts electric power supply to the person detection sensor 130, and switches the state of the person detection sensor 130 to the operation state.

Subsequently, the control unit 110 records, as closed-state person detection information, a signal provided from the person detection sensor 130 (step S222). More specifically, in a case where the state of the person detection sensor 130 becomes the operation state, and a person detection signal is provided to the control unit 110, the control unit 110 records, to the predetermined area of the RAM 113, the closed-state person detection information indicating that a person is detected when the door 20 is closed. On the contrary, in a case where the state of the person detection sensor 130 becomes the operation state, and a person non-detection signal is provided to the control unit 110, the control unit 110 records, to the predetermined area of the RAM 113, the closed-state person detection information indicating that the any person is not detected when the door 20 is closed.

Subsequently, the control unit 110 causes the person detection sensor 130 to be in the non-operation state (step S223). More specifically, the control unit 110 provides, to the power saving control unit 150, a predetermined signal for causing the person detection sensor 130 to be in the non-operation state. The power saving control unit 150 receives supply of the predetermined signal from the control unit 110, and stops electric power supply to the person detection sensor 130, and switches the state of the person detection sensor 130 to the non-operation state.

When the processing in step S223 is finished, the control unit 110 terminates the closed-state person detection processing, and resumes the room entry and exit detection processing in step S150 and subsequent steps as shown in FIG. 8. Step S150 and subsequent steps are the same as those performed by the room entry and exit apparatus 100 in the first embodiment.

As explained above, when the door is opened and closed, the room entry and exit detection apparatus 200 according to the present embodiment causes the person detection sensor 130 to be in the operation state, and after the open-state person detection information or the closed-state person detection information is recorded, the room entry and exit detection apparatus 200 according to the present embodiment causes the person detection sensor 130 to be in the non-operation state again. More specifically, the room entry and exit detection apparatus 200 does not supply the electric power to the person detection sensor 130 while the door is not opened and closed, and the room entry and exit detection apparatus 200 supplies the electric power to the person detection sensor 130 only while the door is opened and closed. Therefore, the amount of electric power consumed by the room entry and exit detection apparatus 200 is less than the amount of electric power consumed by the room entry and exit detection apparatus 100 supplying electric power to the person detection sensor 130 regardless of whether the door is opened and closed.

The embodiments of the present disclosure have been hereinabove explained, but the present disclosure is not limited thereto.

In the above embodiments, the open and close detection sensor 120 includes the acceleration sensor 120a, but instead of the acceleration sensor 120a, for example, any one of a contact switch, a position sensor, and a distance sensor may be provided, as long as a sensor can detect open and close of the door 20.

In the above embodiments, the person detection sensor 130 includes the pyroelectric infrared sensor 130a, but instead of the pyroelectric infrared sensor 130a, for example, any one of a piezoelectric sensor (a mat-type sensor that reacts to weight) and a Doppler sensor for detecting motion may be provided, as long as a sensor can detect a person.

The embodiments of the present disclosure have been hereinabove explained, but the present disclosure is not limited to the embodiments, and, for example, the present disclosure also includes aspects made by combining each embodiment as necessary, and a technical scope equivalent thereto.

Figure 10:
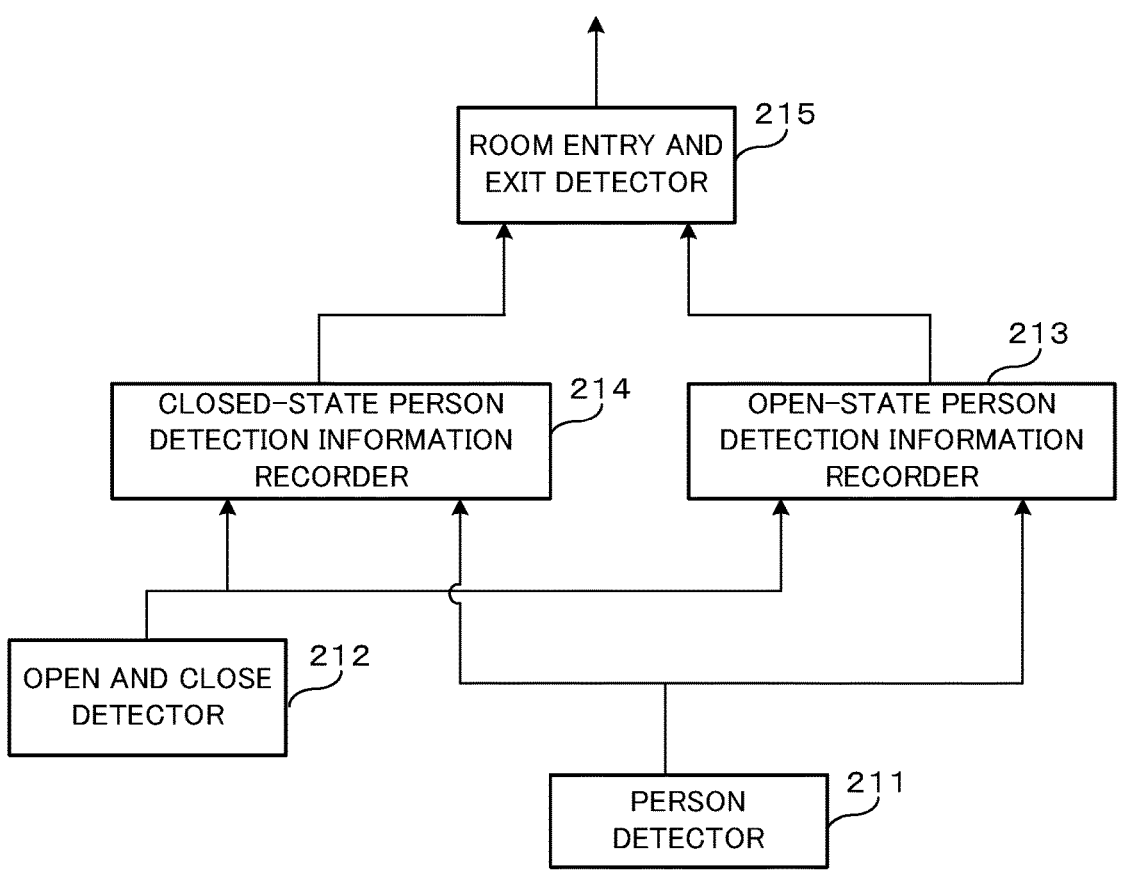
FIG. 10 is a figure illustrating the functions of a room entry and exit detection apparatus according to the present disclosure.

Further, the room entry and exit detection apparatus according to the embodiments of the present disclosure includes a person detector 211, an open and close detector 212, an open-state person detection information recorder 213, a closed-state person detection information recorder 214, and a room entry and exit detector 215 as shown in FIG. 10.

The person detector 211 includes a pyroelectric infrared sensor and a sensor capable of detecting presence of any person such as a weight sensor, and detects a person in the detection target area at a surface of the door.

The open and close detector 212 includes an acceleration sensor, a position sensor, a contact sensor, and the like, and detects whether the door is in an open state or closed state.

When the open and close detector 212 detects that the door is switched from the closed state to the open state, the open-state person detection information recorder 213 records whether the person detector 211 is detecting a person.

When the open and close detector 212 detects that the door is switched from the open state to the closed state, the closed-state person detection information recorder 214 records whether the person detector 211 is detecting a person.

Figure 3:
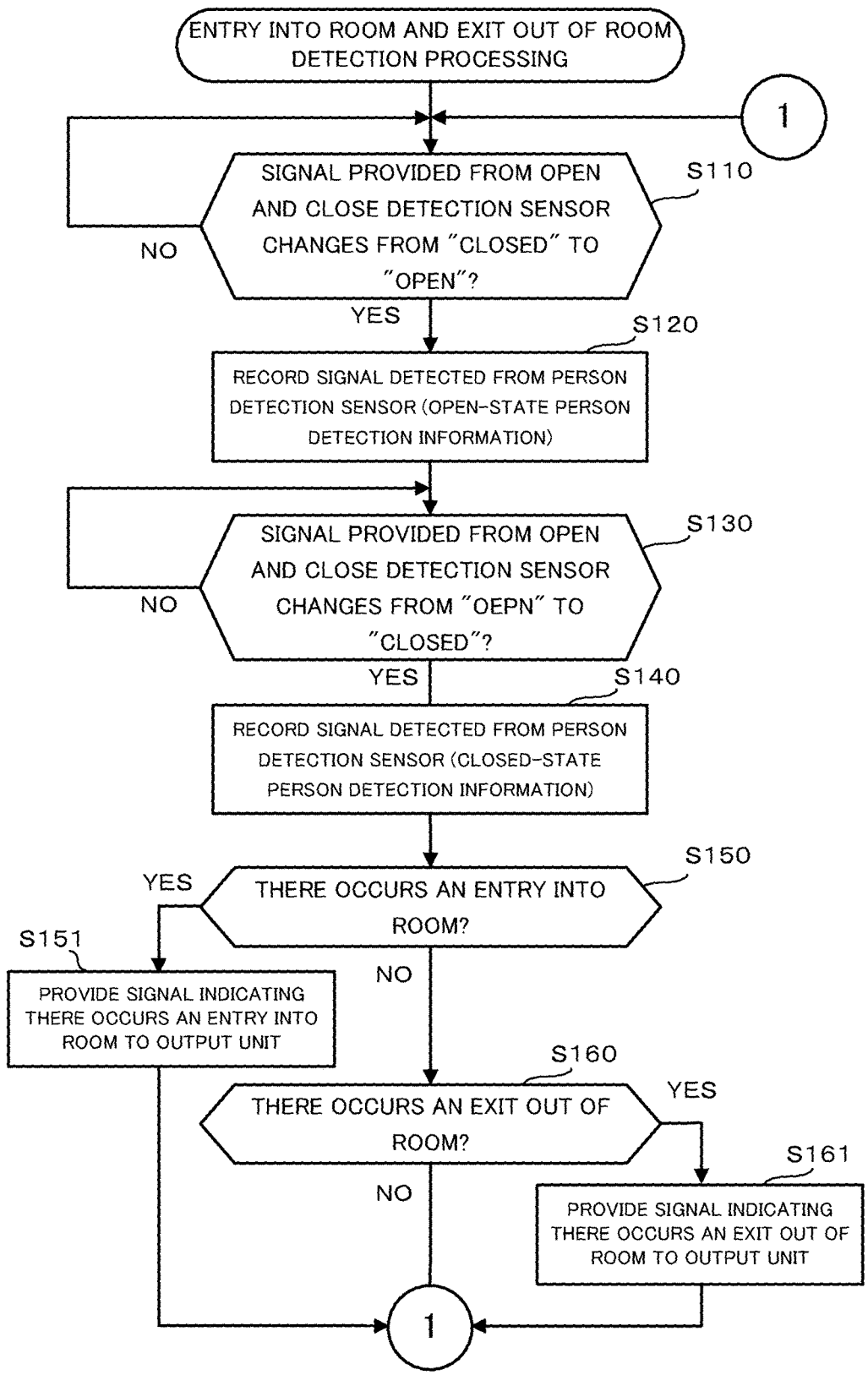
FIG. 3 is a flowchart illustrating room entry and exit detection processing according to the first embodiment.

The room entry and exit detector 215 detects whether there occurs an entry into the room or an exit out of the room in accordance with, for example, the same logic as step S150, step S151, step S160, step S161 shown in FIG. 3, on the basis of the contents recorded by the open-state person detection information recorder 213 and the closed-state person detection information recorder 214. The room entry and exit detector 215 outputs, to another device, the detected presence or absence of an entry into the room and an exit out of the room.

According to such configuration, the problem of the present disclosure is solved, and the effects of the present disclosure can be achieved.

It should be noted that the room entry and exit detection apparatus according to the present disclosure is not dependent on a dedicated system, and may be realized by using an ordinary computer system. For example, a program for executing the above operation may be stored to a computer-readable storage medium to be distributed to a computer, and a room entry and exit detection apparatus executing the above processing may be configured by installing the program to the computer system. Further, a program may be stored to a disk apparatus and the like provided in a server apparatus on the Internet, and the above functions may be realized by cooperating with the OS (Operating System) and application software. In this case, only a portion other than the OS may be stored and distributed in a medium, and, for example, the portion may be overlaid on a carrier wave and downloaded to a computer.

Computer-readable recording media such as a USB (Universal Serial Bus) memory, a flexible disk, a CD (Compact Disc), a DVD (Digital Versatile Disc), a Blu-ray (registered trademark) Disc, an MO disk (Magneto Optical Disk), an SD (Secure Digital) card, a memory stick (registered trademark), and further, a magnetic disk, an optical disk, a magneto-optical disk, a semiconductor memory, a magnetic tape, and the like can be used as a recording medium for recording the above program.

The foregoing describes some example embodiments for explanatory purposes. Although the foregoing discussion has presented specific embodiments, persons skilled in the art will recognize that changes may be made in form and detail without departing from the broader gist and scope of the invention. Accordingly, the specification and drawings are to be regarded in an illustrative rather than a restrictive sense. This detailed description, therefore, is not to be taken in a limiting sense, and the scope of the invention is defined only by the included Claims, along with the full range of equivalents to which such Claims are entitled.

Some or all of the above embodiments may be described as shown in the following Supplementary Notes, but are not limited thereto.

(Supplementary Note 1)

A room entry and exit detection apparatus comprising:

a person detection sensor configured to detect a person in an area facing one surface of a door;

an open and close detection sensor configured to detect whether the door is in an open state or in a closed state;

an open-state person detection information recorder, wherein when a state of the door detected by the open and close detection sensor switches from a closed state to an open state, the open-state person detection information recorder is configured to record whether the person detection sensor is detecting a person or not at that point in time;

a closed-state person detection information recorder, wherein when the state of the door detected by the open and close detection sensor switches from the open state to the closed state, the closed-state person detection information recorder is configured to record whether the person detection sensor is detecting a person or not at that point in time; and a room entry and exit detector configured to detect that there occurs an entry into the room and there occurs an exit out of the room on the basis of a content recorded by the open-state person detection information recorder and the closed-state person detection information recorder.

(Supplementary Note 2)

The room entry and exit detection apparatus according to Supplementary Note 1, wherein the person detection sensor is configured to detect a person in an area facing a surface of a door of a room at an outside of the room, and the room entry and exit detector is configured to detect that there occurs an entry into the room in a case where the open-state person detection information recorder records that the person detection sensor has detected presence of the person, and the closed-state person detection information recorder records that the person detection sensor has not detected presence of the person, and the room entry and exit detector is configured to detect that there occurs an exit out of the room in a case where the open-state person detection information recorder records that the person detection sensor has not detected presence of the person, and the closed-state person detection information recorder records that the person detection sensor has detected presence of the person.

(Supplementary Note 3)

The room entry and exit detection apparatus according to Supplementary Note 1 or 2 comprising a power saving control unit configured to switch an operation state and a non-operation state of the person detection sensor by controlling electric power supply to the person detection sensor, when the state of the door detected by the open and close detection sensor is switched from the closed state to the open state, the power saving control unit switches the person detection sensor into the operation state, and when the open-state person detection information recorder records whether the person detection sensor is detecting presence of the person or not at that point in time, the power saving control unit switches the person detection sensor into the non-operation state, and when the state of the door detected by the open and close detection sensor switches from the open state to the closed state, the power saving control unit switches the person detection sensor to the operation state, and when the closed-state person detection information recorder records whether the person detection sensor is detecting presence of the person or not at that point in time, the power saving control unit switches the person detection sensor into the non-operation state, the power saving control unit switches the person detection sensor into the non-operation state.

(Supplementary Note 4)

The room entry and exit detection apparatus according to any one of Supplementary Notes 1 to 3, wherein the open and close detection sensor comprises an acceleration sensor configured to detect an acceleration of the door, and detects whether the door is in the open state or in the closed state on the basis of an acceleration of the door detected by the acceleration sensor.

(Supplementary Note 5)

The room entry and exit detection apparatus according to any one of Supplementary Notes 1 to 4, wherein the person detection sensor comprises an infrared sensor configured to receive infrared light emitted by a human body to detect that a person enters into an area facing one surface of the door or a person exits out of the area facing the one surface of the door.

(Supplementary Note 6)

A room entry and exit detection method comprising:

a person detection step of detecting a person in an area facing one surface of a door;

an open and close detection step of detecting whether the door is in an open state or in a closed state;

an open-state person detection information recording step of, when a state of the door detected in the open and close detection step switches from a closed state to an open state, recording whether a person is detected or not at that point in time in the person detection step;

a closed-state person detection information recording step of, when the state of the door detected in the open and close detection step switches from the open state to the closed state, t recording whether a person is detected or not at that point in time in the person detection step; and a room entry and exit detection step of detecting that there occurs an entry into the room and there occurs an exit out of the room on the basis of a content recorded in the open-state person detection information recording step and the closed-state person detection information recording step.

(Supplementary Note 7)

A computer-readable recording medium recorded with a program for causing a computer to realize:

a person detection function configured to detect a person in an area facing one surface of a door;

an open and close detection function configured to detect whether the door is in an open state or in a closed state;

an open-state person detection information recording function, wherein when a state of the door detected by the open and close detection function switches from a closed state to an open state, the open-state person detection information recording function is configured to record whether the person detection function is detecting a person or not at that point in time;

a closed-state person detection information recording function, wherein when the state of the door detected by the open and close detection function switches from the open state to the closed state, the closed-state person detection information recording function is configured to record whether the person detection function is detecting a person or not at that point in time; and a room entry and exit detection function configured to detect that there occurs an entry into the room and there occurs an exit out of the room on the basis of a content recorded by the open-state person detection information recording function and the closed-state person detection information recording function.

The present invention is based on Japanese Patent Application No. 2013-43065 filed on Mar. 5, 2013. The entire specification, Claims, and drawings of Japanese Patent Application No. 2013-43065 are incorporated into this specification by reference.

INDUSTRIAL APPLICABILITY

The present invention is useful in the field of marketing where it is required to find entry and exit of customers in and out of commercial facilities, and can also be used for the purpose of security to detect an intruder intruding into an intrusion prohibited area.

REFERENCE SIGNS LIST

40 Device
100, 200 Room entry and exit detection apparatus
110 Control unit
111 CPU
112 ROM
113 RAM
120 Open and close detection sensor
120a Acceleration sensor
130 Person detection sensor
130a Pyroelectric infrared sensor
130b Piezoelectric sensor
140 Output unit
150 Power saving control unit
211 Person detector
212 Open and close detector
213 Open-state person detection information recorder
214 Closed-state person detection information recorder
215 Room entry and exit detector

The invention claimed is:

1. A room entry and exit detection apparatus comprising:
a person detection sensor configured to detect a person in an area facing one surface of a door;
an open and close detection sensor configured to detect whether the door is in an open state or in a closed state;

an open-state person detection information recorder, wherein when a state of the door detected by the open and close detection sensor switches from a closed state to an open state, the open-state person detection information recorder is configured to record whether the person detection sensor is detecting a person or not at that point in time;

a closed-state person detection information recorder, wherein when the state of the door detected by the open and close detection sensor switches from the open state to the closed state, the closed-state person detection information recorder is configured to record whether the person detection sensor is detecting a person or not at that point in time;

a room entry and exit detector configured to detect that there occurs an entry into the room and there occurs an exit out of the room on the basis of a content recorded by the open-state person detection information recorder and the closed-state person detection information recorder;

a power saving control unit configured to switch an operation state and a non-operation state of the person detection sensor by controlling electric power supply to the person detection sensor, when the state of the door detected by the open and close detection sensor is switched from the closed state to the open state, the power saving control unit switches the person detection sensor into the operation state, and when the open-state person detection information recorder records whether the person detection sensor is detecting presence of the person or not at that point in time, the power saving control unit switches the person detection sensor into the non-operation state, and when the state of the door detected by the open and close detection sensor switches from the open state to the closed state, the power saving control unit switches the person detection sensor to the operation state, and when the closed-state person detection information recorder records whether the person detection sensor is detecting presence of the person or not at that point in time, the power saving control unit switches the person detection sensor into the non-operation state, the power saving control unit switches the person detection sensor into the non-operation state.

2. The room entry and exit detection apparatus according to claim 1, wherein the person detection sensor is configured to detect a person in an area facing a surface of a door of a room at an outside of the room, and the room entry and exit detector is configured to detect that there occurs an entry into the room in a case where the open-state person detection information recorder records that the person detection sensor has detected presence of the person, and the closed-state person detection information recorder records that the person detection sensor has not detected presence of the person, and the room entry and exit detector is configured to detect that there occurs an exit out of the room in a case where the open-state person detection information recorder records that the person detection sensor has not detected presence of the person, and the closed-state person detection information recorder records that the person detection sensor has detected presence of the person.

3. The room entry and exit detection apparatus according to claim 2, wherein the person detection sensor comprises an infrared sensor configured to receive infrared light emitted by a human body to detect that a person enters into an area facing one surface of the door or a person exits out of the area facing the one surface of the door.

4. The room entry and exit detection apparatus according to claim 1, wherein the person detection sensor comprises an infrared sensor configured to receive infrared light emitted by a human body to detect that a person enters into an area facing one surface of the door or a person exits out of the area facing the one surface of the door.

5. The room entry and exit detection apparatus according to claim 1, wherein the open and close detection sensor comprises an acceleration sensor configured to detect an acceleration of the door, and detects whether the door is in the open state or in the closed state on the basis of an acceleration of the door detected by the acceleration sensor.

6. The room entry and exit detection apparatus according to claim 5, wherein the person detection sensor comprises an infrared sensor configured to receive infrared light emitted by a human body to detect that a person enters into an area facing one surface of the door or a person exits out of the area facing the one surface of the door.

7. The room entry and exit detection apparatus according to claim 1, wherein the person detection sensor comprises an infrared sensor configured to receive infrared light emitted by a human body to detect that a person enters into an area facing one surface of the door or a person exits out of the area facing the one surface of the door.

8. A room entry and exit detection apparatus comprising:
a person detection sensor configured to detect a person in an area facing one surface of a door;
an open and close detection sensor configured to detect whether the door is in an open state or in a closed state;
an open-state person detection information recorder, wherein when a state of the door detected by the open and close detection sensor switches from a closed state to an open state, the open-state person detection information recorder is configured to record whether the person detection sensor is detecting a person or not at that point in time;
a closed-state person detection information recorder, wherein when the state of the door detected by the open and close detection sensor switches from the open state to the closed state, the closed-state person detection information recorder is configured to record whether the person detection sensor is detecting a person or not at that point in time; and
a room entry and exit detector configured to detect that there occurs an entry into the room and there occurs an exit out of the room on the basis of a content recorded by the open-state person detection information recorder and the closed-state person detection information recorder;
wherein the open and close detection sensor comprises an acceleration sensor configured to detect an acceleration of the door, and detects whether the door is in the open state or in the closed state on the basis of an acceleration of the door detected by the acceleration sensor.

9. The room entry and exit detection apparatus according to claim 8, wherein the person detection sensor comprises an infrared sensor configured to receive infrared light emitted by a human body to detect that a person enters into an area facing one surface of the door or a person exits out of the area facing the one surface of the door.

10. A room entry and exit detection apparatus comprising:
a person detection sensor configured to detect a person in an area facing one surface of a door;
an open and close detection sensor configured to detect whether the door is in an open state or in a closed state;

an open-state person detection information recorder, wherein when a state of the door detected by the open and close detection sensor switches from a closed state to an open state, the open-state person detection information recorder is configured to record whether the person detection sensor is detecting a person or not at that point in time;

a closed-state person detection information recorder, wherein when the state of the door detected by the open and close detection sensor switches from the open state to the closed state, the closed-state person detection information recorder is configured to record whether the person detection sensor is detecting a person or not at that point in time; and a room entry and exit detector configured to detect that there occurs an entry into the room and there occurs an exit out of the room on the basis of a content recorded by the open-state person detection information recorder and the closed-state person detection information recorder;

wherein the person detection sensor is configured to detect a person in an area facing a surface of a door of a room at an outside of the room, and the room entry and exit detector is configured to detect that there occurs an entry into the room in a case where the open-state person detection information recorder records that the person detection sensor has detected presence of the person, and the closed-state person detection information recorder records that the person detection sensor has not detected presence of the person, and the room entry and exit detector is configured to detect that there occurs an exit out of the room in a case where the open-state person detection information recorder records that the person detection sensor has not detected presence of the person, and the closed-state person detection information recorder records that the person detection sensor has detected presence of the person;

further comprising a power saving control unit configured to switch an operation state and a non-operation state of the person detection sensor by controlling electric power supply to the person detection sensor, when the state of the door detected by the open and close detection sensor is switched from the closed state to the open state, the power saving control unit switches the person detection sensor into the operation state, and when the open-state person detection information recorder records whether the person detection sensor is detecting presence of the person or not at that point in time, the power saving control unit switches the person detection sensor into the non-operation state, and when the state of the door detected by the open and close detection sensor switches from the open state to the closed state, the power saving control unit switches the person detection sensor to the operation state, and when the closed-state person detection information recorder records whether the person detection sensor is detecting presence of the person or not at that point in time, the power saving control unit switches the person detection sensor into the non-operation state, the power saving control unit switches the person detection sensor into the non-operation state.

11. The room entry and exit detection apparatus according to claim 10, wherein the open and close detection sensor comprises an acceleration sensor configured to detect an acceleration of the door, and detects whether the door is in the open state or in the closed state on the basis of an acceleration of the door detected by the acceleration sensor.

12. The room entry and exit detection apparatus according to claim 10, wherein the person detection sensor comprises an infrared sensor configured to receive infrared light emitted by a human body to detect that a person enters into an area facing one surface of the door or a person exits out of the area facing the one surface of the door.

13. A room entry and exit detection apparatus comprising:

a person detection sensor configured to detect a person in an area facing one surface of a door;

an open and close detection sensor configured to detect whether the door is in an open state or in a closed state;

an open-state person detection information recorder, wherein when a state of the door detected by the open and close detection sensor switches from a closed state to an open state, the open-state person detection information recorder is configured to record whether the person detection sensor is detecting a person or not at that point in time;

a closed-state person detection information recorder, wherein when the state of the door detected by the open and close detection sensor switches from the open state to the closed state, the closed-state person detection information recorder is configured to record whether the person detection sensor is detecting a person or not at that point in time; and a room entry and exit detector configured to detect that there occurs an entry into the room and there occurs an exit out of the room on the basis of a content recorded by the open-state person detection information recorder and the closed-state person detection information recorder;

wherein the person detection sensor is configured to detect a person in an area facing a surface of a door of a room at an outside of the room, and the room entry and exit detector is configured to detect that there occurs an entry into the room in a case where the open-state person detection information recorder records that the person detection sensor has detected presence of the person, and the closed-state person detection information recorder records that the person detection sensor has not detected presence of the person, and the room entry and exit detector is configured to detect that there occurs an exit out of the room in a case where the open-state person detection information recorder records that the person detection sensor has not detected presence of the person, and the closed-state person detection information recorder records that the person detection sensor has detected presence of the person; and wherein the open and close detection sensor comprises an acceleration sensor configured to detect an acceleration of the door, and detects whether the door is in the open state or in the closed state on the basis of an acceleration of the door detected by the acceleration sensor.

14. The room entry and exit detection apparatus according to claim 13, wherein the person detection sensor comprises an infrared sensor configured to receive infrared light emitted by a human body to detect that a person enters into an area facing one surface of the door or a person exits out of the area facing the one surface of the door.

* * * * *